United States Patent
Washiyama et al.

(10) Patent No.: US 6,586,531 B2
(45) Date of Patent: Jul. 1, 2003

(54) POLYOLEFIN MASTERBATCH AND COMPOSITION SUITABLE FOR INJECTION MOLDING

(75) Inventors: Junichiro Washiyama, Yokohama (JP); Kazuhiko Minowa, Yokohama (JP); Hiroshi Takenouchi, Kanagawa (JP); Takeshi Nakajima, Tokyo (JP); Masamitsu Yamauchi, Kawasaki (JP); Yutaka Yokoyama, Ferrara (IT); Anteo Pelliconi, Rovigo (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/963,529

(22) Filed: Sep. 27, 2001

(65) Prior Publication Data

US 2003/0040583 A1 Feb. 27, 2003

Related U.S. Application Data

(60) Provisional application No. 60/237,364, filed on Oct. 4, 2000.

(51) Int. Cl.$^7$ .............................. C08L 23/04; C08L 9/00; C08F 8/00
(52) U.S. Cl. .................... 525/240; 525/232; 525/191
(58) Field of Search .................. 525/191, 232, 525/240

(56) References Cited

U.S. PATENT DOCUMENTS

| | | | |
|---|---|---|---|
| 4,399,054 A | 8/1983 | Ferraris et al. | 252/429 B |
| 4,472,524 A | 9/1984 | Albizzati | 502/113 |
| 4,510,292 A | 4/1985 | Chiba et al. | 525/247 |
| 5,055,528 A | 10/1991 | Kioka et al. | 525/270 |
| 5,519,090 A | 5/1996 | Schwager et al. | 525/240 |
| 6,441,094 B1 * | 8/2002 | Cecchin et al. | 525/191 |

FOREIGN PATENT DOCUMENTS

| | | | |
|---|---|---|---|
| EP | 0045977 | 2/1982 | C08F/10/00 |
| EP | 0170255 | 2/1986 | C08F/297/08 |
| EP | 0361493 | 4/1990 | C07C/43/10 |
| EP | 0373660 | 6/1990 | C08F/297/08 |
| EP | 0518125 | 12/1992 | C08L/23/10 |
| EP | 0646624 | 4/1995 | C08L/23/10 |
| EP | 0674991 | 10/1995 | B32B/27/32 |
| EP | 0728769 | 8/1996 | |
| JP | 9169826 | 6/1997 | |
| JP | 9227735 | 9/1997 | |

* cited by examiner

Primary Examiner—Nathan M. Nutter
Assistant Examiner—Thao Tran

(57) ABSTRACT

A masterbatch composition, a polyolefin composition prepared from the masterbatch and articles prepared from the polyolefin composition. The masterbatch contains (percent by weight) from 20% to 90% of A) a crystalline polypropylene containing from 25% to 75% of a fraction $A^I$ having a melt flow rate $MFR^I$ of from 0.5 to 10 g/10 min., and from 75% to 25% of a fraction $A^{II}$ having a melt flow rate $MFR^{II}$ such that $MFR^{II}/MFR^I$ is from 30 to 2000; and from 10% to 80% of B) a copolymer of ethylene and at least one $C_3$–$C_{10}$ α-olefin, the copolymer containing from 10 to 70% of ethylene, the copolymer being soluble in xylene at room temperature, and having an intrinsic viscosity [η] of from 4 to 9 dl/g. Articles prepared from the polyolefin composition exhibit a good balance of physical properties and reduced surface defects such as tiger striping.

14 Claims, No Drawings

POLYOLEFIN MASTERBATCH AND COMPOSITION SUITABLE FOR INJECTION MOLDING

This application claims priority of U.S. provisional patent application Ser. No. 60/237,364, filed Oct. 4, 2000.

BACKGROUND OF THE INVENTION

This invention relates to a polyolefin masterbatch which can be used to prepare a polyolefin composition suitable for injection molding into relatively large articles. More particularly, the polyolefin composition can be injection molded into large objects which exhibit improved surface properties, particularly with respect to reduction of tiger striping.

Polypropylene and thermoplastic polyolefins have enjoyed wide commercial acceptance because of their outstanding cost/performance characteristics. For example, these polymers are used in molded-in color applications because of their good weatherability.

Polypropylene and thermoplastic polyolefins are generally injection molded into desired articles. Relatively large parts, such as automobile bumpers and fascia, offer particularly challenging problems such as cold flow and tiger striping. "Cold flow" occurs when the molten polymer being injected into a mold begins to cool and solidify before the mold is completely filled with the polymer. "Tiger striping" refers to color and gloss variations on the surface of an injection molded article, which occur because of unstable mold filling properties of the molten polymer as it is being injected into the mold and formed into the desired shape.

The art has made various proposals to improve the physical characteristics of injection molded articles. Thus, Mizutani et al., "Flow Mark Reduction of Metallic Colored PP," *SAE 2000 World Congress* (2000) discloses that the use of a low molecular weight polypropylene matrix having a broad molecular weight distribution improves the surface aesthetics of injection molded parts.

U.S. Pat. No. 5,055,528 discloses a sequential polymerization process for producing a propylene block copolymer having a melt flow rate of at least 10 g/min. and which is said to possess good flowability, moldability and impact strength.

U.S. Pat. No. 6,048,942 proposes a thermoplastic olefin composition useful for making molded articles having high surface gloss and mar resistance which contains (1) a propylene homopolymer, copolymer or terpolymer, (2) either a low molecular weight ethylene copolymer rubber, an elastomeric copolymer of ethylene and a $C_3$–$C_8$ α-olefin made with a metallocene catalyst, or a mixture of the two, and (3) a lubricant.

Japanese Patent Publication No. 9-227,735 discloses a propylene-based resin composition said to be suitable for injection molding products having good appearance and difficult to notice flow marks. The composition contains specified amounts of a propylene-based copolymer and either an ethlene-based copolymer or a styrene-based block copolymer, optionally together with an inorganic filler and/or a nucleating agent.

An object of the present invention is to provide a polyolefin composition which can be injection molded into large articles which exhibit a good balance of physical properties and minimal tiger striping.

Another object of the present invention is to provide a convenient method for preparing this polyolefin composition based on a masterbatch composition.

A feature of the masterbatch composition of the present invention is a crystalline polypropylene component which has a bimodal molecular weight distribution. Another feature of the masterbatch composition is a xylene-soluble ethylene copolymer component having a high intrinsic viscosity of 4 to 9 dl/g at room temperature.

A feature of the polyolefin composition of the present invention is the presence of a crystalline polypropylene component which has a bimodal molecular weight distribution and at least 3 weight percent of a xylene-soluble ethylene copolymer component having a high intrinsic viscosity of 4 to 9 dl/g at room temperature.

An advantage of the masterbatch composition is its ability to be formulated with a broad molecular weight olefin matrix to form a polyolefin composition having high melt fluidity which can be injection molded into large articles such as automobile bumpers which exhibit a good balance of physical properties and reduced flow marks such as tiger striping.

SUMMARY OF THE INVENTION

In one aspect, the present invention relates to a masterbatch composition, containing (percent by weight):
A) 20%–90% of a crystalline polypropylene component containing from 25% to 75% of a fraction $A^I$ having a melt flow rate $MFR^I$ of from 0.5 to 10 g/10 min., and from 75% to 25% of a fraction $A^{II}$ having a melt flow rate $MFR^{II}$ such that a ratio $MFR^{II}/MFR^I$ is from 30 to 2000; and wherein fractions $A^I$ and $A^{II}$ are independently selected from the group consisting of a propylene homopolymer, a random copolymer of propylene containing up to 8% of ethylene, and a random copolymer of propylene containing up to 8% of at least one $C_4$–$C_{10}$ α-olefin; and
B) 10%–80% of a copolymer component of ethylene and at least one $C_3$–$C_{10}$ α-olefin, the copolymer containing from 10 to 70% of ethylene, and optionally minor amounts of a diene, said copolymer being soluble in xylene at room temperature, and having an intrinsic viscosity [η] of from 4 to 9 dl/g.

In another aspect, the present invention relates to a polyolefin composition suitable for injection molding, containing (all percentages by weight of the total composition):
A) from 0.1 to 50% of a masterbatch composition comprising
 i) 20%–90% of a crystalline polypropylene component containing from 25% to 75% of a fraction $A^I$ having a melt flow rate $MFR^I$ of from 0.5 to 10 g/10 min., and from 75% to 25% of a fraction $A^{II}$ having a melt flow rate $MFR^I$ such that a ratio $MFR^{II}/MFR^I$ is from 30 to 2000; and wherein fractions $A^I$ and $A^{II}$ are independently selected from the group consisting of a propylene homopolymer, a random copolymer of propylene containing up to 8% of ethylene, and a random copolymer of propylene containing up to 8% of at least one $C_4$–$C_{10}$ α-olefin; and
 ii) 10%–80% of a copolymer component of ethylene and at least one $C_3$–$C_{10}$ α-olefin, the copolymer containing from 10 to 70% of ethylene, and optionally minor amounts of a diene, said copolymer being soluble in xylene at room temperature, and having an intrinsic viscosity [η] of from 4 to 9 dl/g; and
B) from 50% to 99.1% of a crystalline propylene homopolymer having an isotactic index greater than 80 or a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum content thereof is 20% by weight, the copolymer having an isotactic index greater than 85.

DETAILED DESCRIPTION OF THE PREFERRED EMBODIMENTS

The masterbatch composition contains at least two components: a crystalline polypropylene component and a copolymer component. The crystalline polypropylene component is present in an amount ranging from 20 to 90%, preferably 30 to 80%, most preferably 50 to 80% of the total weight of the masterbatch composition. Conversely, the copolymer component is present in an amount of from 80 to 10%, preferably 70 to 20%, most preferably 50 to 20% of the total weight of the masterbatch composition, with the sum of the percentage amounts of the individual components of the masterbatch composition equal to 100 percent.

The fractions $A^I$ and $A^{II}$ which form the crystalline polypropylene component can each be a propylene homopolymer, a random copolymer of propylene containing up to 8%, preferably 0.2 to 5% of ethylene, or a random copolymer of propylene containing up to 8%, preferably 1 to 8%, of at least one $C_4$–$C_{10}$ α-olefin which conforms to the formula $CH_2$=CHR, wherein R is a linear or branched alkyl $C_{1-8}$ radical or an aryl radical such as phenyl. Illustrative $C_4$–$C_{10}$ α-olefins include 1-butene, 1-pentene, 1-hexene, 4-methyl-1-pentene and 1-octene, with 1-butene being particularly preferred.

Fractions $A^I$ and $A^{II}$ differ from one another in their molecular weight distribution, as described by melt flow rate. Fraction $A^I$ has a relatively high molecular weight (low melt flow rate $MFR^I$ of from 0.5 to 10 g/10 min.) while fraction $A^{II}$ has a relatively low molecular weight (high melt flow rate). This relationship is defined by the ratio $MFR^{II}/MFR^I$, which can range from 30 to 2000, preferably 40 to 2000, more preferably 50 to 1000, still more preferably 100 to 800.

The inventors currently believe that a bimodal molecular weight distribution improves the spiral flow length, flexural modulus and surface aesthetics, including reduced tiger striping, of injection molded articles prepared from the polyolefin composition.

The melt flow rate of the masterbatch composition, as measured according to ASTM 1238, condition L (MFRL) can range from 0.1 to 50 g/10 min., more preferably from 0.3 to 20 g/10 min.

The manufacture of propylene homopolymers, random copolymers of propylene and ethylene and random copolymers of propylene containing up to 8% of at least one $C_4$–$C_{10}$ α-olefin which are suitable for use as fractions $A^I$ and $A^{II}$ are well known to those of ordinary skill in the art. Generally, for propylene copolymers the content of polymer which is insoluble in xylene at room temperature (23° C.) (i.e., substantially equivalent to the isotacticity index) for fractions $A^I$ and $A^{II}$ is not less than 80%, more preferably not less than 85%, and most preferably not less than 90% by weight. For propylene homopolymers, the content of polymer which is insoluble in xylene at room temperature is not less than 90%, more preferably not less than 95%, and most preferably not less than 97% by weight, based on the weight of the single fraction.

The other component of the masterbatch composition is a copolymer component containing from 10 to 70% of ethylene, at least one $C_3$–$C_{10}$ α-olefin having the formula $CH_2$=CHR where R is a linear or branched $C_{1-8}$ alkyl radical or an aryl radical such as phenyl, and optionally a minor amount of a diene. The ethylene content of the copolymer component is preferably 15 to 60%, most preferably 15 to 50%.

Illustrative $C_3$–$C_{10}$ α-olefins include propylene, 1-butene, 1-pentene, 1-hexene, 4-methyl-1-pentene and 1-octene, with propylene and 1-butene being particularly preferred.

Suitable dienes include butadiene, 1,4-hexadiene, 1,5-hexadiene and ethylidene-norbornene-1. When present, the diene is typically in an amount of 0.5 to 10% by weight with respect to the weight of the copolymer component.

The copolymer component is soluble in xylene at room temperature, and has an intrinsic viscosity [η] at room temperature of from 4 to 9, preferably 5 to 8, most preferably 5.5 to 7 dl/g.

The inventors currently believe that a high intrinsic viscosity copolymer component also reduces the severity of tiger striping and results in an article having lower gloss.

The manufacture of ethylene copolymers suitable for use as the copolymer component is well known to those of ordinary skill in the art.

In a preferred embodiment, the masterbatch composition can be prepared by at least a three step sequential polymerization, in which components A) and B) are prepared in separate subsequent steps, operating in each step, except the first step, in the presence of the polymer formed and the catalyst used in the preceding step. The catalyst is added only in the first step; however, its activity is such that it is still active for all the subsequent steps. Thus, in at least two polymerization steps the relevant monomer(s) are polymerized to form fractions $A^I$ and $A^{II}$ and in the other step(s) a mixture of ethylene and the $C_3$–$C_{10}$ α-olefin(s) is polymerized to form component B. Preferably, fraction $A^I$ is prepared before fraction $A^{II}$ and even more preferably, fraction B is prepared between fractions $A^I$ and $A^{II}$.

The sequential polymerization is performed using a stereospecific Ziegler-Natta catalyst capable of producing polypropylene having an isotacticity index greater than 90%, preferably greater than 95%. The catalyst must also be sufficiently sensitive to molecular weight regulators (particularly hydrogen) to produce polypropylene having MFR values from less than 1 g/10 min. to 1000 g/10 min. or more.

Ziegler-Natta catalysts which possess these properties contain (i) a solid catalyst component comprising a titanium compound having at least one titanium-halogen bond, and an electron-donor compound, both supported on a magnesium halide in active form, (ii) a co-catalyst component comprising an organoaluminum compound, such as an aluminum alkyl compound, and optionally (iii) an external electron donor. Such catalysts are well known to those of ordinary skill in the art, as evidenced by U.S. Pat. Nos. 4,399,054, and 4,472,524, the disclosures of which are hereby incorporated by reference in their entirety.

The solid catalyst component of the Ziegler-Natta catalyst acts an internal electron donor, and may be a compound selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of the following formula:

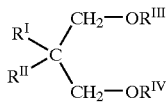

where $R^I$ and $R^{II}$ are the same or different and are $C_{1-18}$ alkyl, $C_{3-18}$ cycloalkyl or $C_{7}$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are described in published European patent applications 361493 and 728769. Representative examples of these diethers include 2-methyl-2-isopropyl-1, 3-dimethoxypropane, 2,2-diisobutyl-1,3-dimethoxypropane, 2-isopropyl-2-cyclopentyl-1,3-dimethoxypropane, 2-isopropyl-2-isoamyl-1, 3-dimethoxypropane, 9, 9-bis (methoxymethyl) fluorene.

The solid catalyst component may be prepared according to various methods. For example, a $MgCl_2 \cdot nROH$ adduct (in particular in the form of spheroidal particles) wherein n is generally from 1 to 3 and ROH is ethanol, butanol or isobutanol, may be reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds which can be used for the preparation of the solid catalyst component are titanium halides and titanium halogen alcoholates. Titanium tetrachloride is preferred.

The reactions described above result in the formation of a magnesium halide in active form. Other reactions are known in the literature, which cause the formation of magnesium halide in active form starting from magnesium compounds other than halides, such as magnesium carboxylates. The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 $m^2/g$) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component. Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical. Examples of silicon compounds are (tert-butyl)$_2$ Si (OCH$_3$)$_2$, (cyclohexyl) (methyl) Si (OCH$_3$)$_2$, (phenyl)$_2$ Si (OCH$_3$)$_2$ and (cyclopentyl)$_2$ Si (OCH$_3$)$_2$. 1,3-diethers having the formulae described above can also be used advantageously. If the internal donor is one of these diethers, the external donors can be omitted.

The molecular weight of the polymers may be regulated using known regulators, preferably hydrogen. By properly dosing the concentration of the molecular weight regulator in the relevant polymerization steps, the previously described MFR and [η] values may be obtained. For preparation of fraction $A^I$ the hydrogen feed ratio $H_2/C_3$ (mol) may range from 0.0001 to 0.01. The hydrogen feed ratio $H_2/C_3$ (mol) for preparing fraction $A^{II}$ may range from 0.1 to 1.5, while the $H_2/C_2$ (mol) ratio for preparing copolymer component B may range from 0.0001 to 0.02.

The whole polymerization process, which can be continuous or batch, is performed according to known techniques and operating in liquid phase, optionally in the presence of an inert diluent, or in the gas phase, or by mixed liquid-gas techniques. It is preferred to carry out the polymerization in gas phase. Generally there is no need for intermediate steps except for the degassing of unreacted monomers. Reaction time, pressure and temperature relative to the two steps are not critical, however it is best if the temperature is from 20 to 100° C. The pressure can be atmospheric or higher.

The catalyst can be pre-contacted with a small amount of olefin in a prepolymerization step using techniques and apparatus well known to those of ordinary skill in the art.

The masterbatch composition of the present invention can also contain additives commonly employed in the art, such as antioxidants, light stabilizers, heat stabilizers, nucleating agents, colorants and fillers.

The masterbatch composition of the present invention can be compounded with a propylene polymer such propylene homopolymers, random copolymers, and heterophasic copolymers to form a polyolefin composition. Accordingly, a second embodiment of the invention relates to a thermoplastic polyolefin composition suitable for injection molding, containing (all percentages by weight of the total composition):

A) from 0.1 to 50% of a masterbatch composition comprising
  i) 20%–90% of a crystalline polypropylene component containing from 25% to 75% of a fraction $A^I$ having a melt flow rate $MFR^{II}$ of from 0.5 to 10 g/10 min., and from 75% to 25% of a fraction $A^{II}$ having a melt flow rate $MFR^{II}$ such that a ratio $MFR^{II}/MFR^I$ is from 30 to 2000; and wherein fractions $A^I$ and $A^{II}$ are independently selected from the group consisting of a propylene homopolymer, a random copolymer of propylene containing up to 8% of ethylene, and a random copolymer of propylene containing up to 8% of at least one $C_4$–$C_{10}$ α-olefin; and
  ii) 10%–80% of a copolymer component of ethylene and at least one $C_3$–$C_{10}$ α-olefin, the copolymer containing from 10 to 70% of ethylene, and optionally minor amounts of a diene, said copolymer being soluble in xylene at room temperature, and having an intrinsic viscosity [η] of from 4 to 9 dl/g; and B) from 50% to 99.1% of a crystalline propylene homopolymer having an isotactic index greater than 80 or a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum content thereof is 20% by weight, the copolymer having an isotactic index greater than 85.

Importantly, the masterbatch composition should be present in an amount sufficient to ensure that at least 3 weight percent, based on total weight of the composition, of its copolymer component is present. The amount of masterbatch composition forming the polyolefin composition preferably ranges between 10 and 20 weight percent based on the total weight of the polyolefin composition.

The polyolefin composition may be manufactured by mixing the masterbatch composition and the crystalline propylene homopolymer or random copolymer together, extruding the mixture, and pelletizing the resulting composition using known techniques and apparatus.

The polyolefin composition may also contain a third component selected from the group consisting of i) an elastomeric copolymer selected from the group consisting of (a) ethylene and propylene, (b) ethylene, propylene and a $C_4$–$C_8$ α-olefin, and (c) ethylene and a $C_4$–$C_{10}$ α-olefin, the copolymer optionally containing from about 0.5 to about 10% by weight of a diene, and containing less than about 70% of ethylene and being soluble in xylene at ambient temperature and having an intrinsic viscosity of about 1.5 to about 4.0 dl/g.;

ii) a heterophasic polyolefin composition comprising:
   (a) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2$=$CHR$, where R is H or a $C_2$–$C_6$ alkyl group, the α-olefin being less than 10% of the copolymer when R is H, and being less than 20% when R is a $C_4$–$C_6$ alkyl group or a combination thereof with R=H, and
   (b) about 2% to about 70% of an elastomeric copolymer of propylene and an α-olefin of the formula $CH_2$=$CHR$, where R is H or a $C_2$–$C_8$ alkyl group, the α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin having an α-olefin content of about 15% to about 60%;

iii) a propylene polymer material having a branching index less than 1 and strain hardening elongational viscosity; and iv) styrenic elastomers such as styrene-ethylene-butene triblock copolymer (SEBS), hydrogenated SEBS and styrene-ethylene-propylene triblock copolymer (SEPS).

The polyolefin composition may also contain conventional additives such as mineral fillers, colorants and stabilizers. Mineral fillers which can be included in the composition include talc, $CaCO_3$ and wollastonite ($CaSiO_3$).

In an alternative embodiment, the polyolefin composition may be prepared without using a masterbatch. Instead, the components of the masterbatch may be individually prepared and mixed with the other components of the polyolefin composition, either simultaneously or in any desired sequence.

The polyolefin compositions of the present invention can be used to prepare finished or semi-finished articles having a desirable balance of properties, including flexural modulus, impact resistance and gloss. The polyolefin composition has particular utility in the production of injection molded articles because the resulting articles exhibit minimal tiger striping.

EXAMPLES

The practice and advantages of the present invention are disclosed below in the following examples. These Examples are illustrative only, and are not intended to limit the allowable scope of the invention in any manner whatsoever.

Example 1

Synthesis of the Masterbatch Composition by Sequential Polymerization

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991, incorporated by reference herein. The solid catalyst component is contacted at –5° C. for 5 minutes with aluminum triethyl (TEAL) and dicyclopentyldimethoxysilane (DCPMS), in a TEAL/DCPMS weight ratio equal to about 15 and in such quantity that the TEAL/Ti molar ratio be equal to 65. The resulting catalyst system is then subjected to prepolymerization by maintaining it in suspension in liquid propylene at 20° C. for about 20 minutes before introducing it into the first polymerization reactor.

The polymerization is carried out continuously using three gas phase reactors equipped with devices for the transfer of the product coming from the reactor immediately preceding to the one immediately following. A propylene homopolymer is produced in the first gas phase polymerization reactor by feeding in a continuous and constant flow propylene in the gas state, the prepolymerized catalyst system and hydrogen, which is used as molecular weight regulator, thus obtaining fraction A′. The hydrogen and propylene monomer are continuously analyzed and fed in such a manner that the desired concentration can be maintained constant.

To obtain copolymer component B, the propylene homopolymer produced in the first reactor is discharged in a continuous flow and, after having been purged of unreacted monomer, is introduced in a continuous flow into a second gas phase reactor, together with quantitatively constant flows of propylene and ethylene in the gas state.

To obtain homopolymer fraction A″, the polymer produced in the second reactor is discharged in a continuous flow and, after having been purged of unreacted monomers, is introduced in a continuous flow into the third gas phase reactor, together with quantitatively constant flows of hydrogen and propylene in the gas state.

The polymer particles exiting the third reactor are subjected to a steam treatment to remove the reactive monomers and volatile substances, and then dried. See Tables 1 and 2 for the polymerization conditions, molar ratio of the reactants and composition of the obtained polymers.

Example 2

Compounding of the Masterbatch Composition with a Propylene Homopolymer

The masterbatch polymer particles of Example 1 are introduced in a rotating drum, where they are mixed with PS20851 propylene homopolymer having a melt index of 1000, 500 ppm calcium stearate and 1500 ppm Irganox B-215, a 33.3/66.7 blend of 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate stabilizer and tris (2,4-di-tert.-butylphenyl)phosphite stabilizer, commercially available from Ciba Specialty Chemicals Corporation, prior to being introduced into a Banbury internal mixer.

The data relating to the final compositions reported in Tables 1 and 2 are obtained from measurements carried out on the so extruded polymers. The data shown in the tables are obtained by using the following test methods.

Melt Flow Rate MFR—Determined according to ASTM D 1238, condition L, unless differently specified. The MFR value for fraction $A^{II}$ ($MFR^{II}$), reported in the Tables as "MFR L (calculated)", is determined according to the equation below:

$$(1-\phi) \log MFR^{II} + \phi \log MFR^{2d} = \log MFR^{3rd}$$

where $\phi$=fraction of the first and second reactor;
$MFR^{2d}$=measured MFR after second reactor; and
$MFR^{3rd}$=measured MFR after the third reactor.

Molar Ratios of the Feed Gases (Feed Ratio)—Determined by gas-chromatography.

Ethylene Content of the Polymers—Determined by I.R. spectroscopy.

Xylene Soluble and Insoluble Fractions—Determined as follows:

2.5 g of polymer and 250 $cm^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 $cm^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Intrinsic Viscosity (I.V.)—Determined in tetrahydronaphthalene at 135° C.

Melting Temperature(Tm), Crystallization Temperature (Tc) and Melting Enthalpy (DH)—Determined by DSC (Differential Scanning Calorimetry).

Flexural Modulus—Determined according to ISO 178.

Tensile Strength at yield—Determined according to ISO R 527.

Elongation at yield—Determined according to ISO R 527.

Tensile Strength at Break—Determined according to ISO R 527.

Elongation at Break—Determined according to ISO R 527.

Izod Impact Strength (Notched)—Determined according to ISO 180/1A.

Energy at −30° C.—Determined according to MA 17324.

Die Swell—Determined according to ISO 11443.

Preparation of the Plaque Specimens—Plaques for gloss measurement, 1 mm thick, are prepared by injection molding according to internal method MA 17335, with an injection time of 3 seconds, temperature of 260° C., and a mold temperature of 40° C.

The injection press is a Battenfeld type BA 500CD with a clamping force of 50 tons. The insert mould leads to the moulding of two plaques (55×60×1 mm each).

Gloss on Plaque—Determined according to internal method MA 17021, available upon request.

The photometer used is a Zehntner model ZGM 1020 or 1022 set with an incident angle of 60°. The measurement principle is given in ASTM D2457.

The apparatus is calibrated using a sample having a known gloss value. One gloss measure is obtained by the measurement on three plaques at two different locations on the same plaque.

Spiral Flow Measurement Test—The spiral flow evaluation comprises injecting molten polymer into the center of a hollow spiral mold, and measuring the total length of solidified resin to determine how far the material will flow before it solidifies under specified conditions of pressure and temperature:

| Injection machine | SANDRETTO Series 7 190 |
| --- | --- |
| Clamping force | 190 ton |
| Screw diameter | 50 mm |
| Maximum volume of the injected polymer | 450 cc |
| Thickness of the spiral | 2.5 mm |
| Width of the spiral | 12.7 mm |
| Melting temperature | 230° C. |
| Mold Temperature | 40° C. |
| Total cycle time | 31 seconds |
| Cooling time | 20 seconds |

The spiral flow measurements are taken at four different pressures:

| Pressure Measured at Machine | Pressure Measured At Material |
| --- | --- |
| 40 bar | 400 bar |
| 60 bar | 600 bar |
| 80 bar | 800 bar |
| 100 bar | 1000 bar |

Note - the pressure of the SANDRETTO machine at 40 bar corresponds to 400 bar on the melt material.

Tiger Striping Evaluation—Plaques having a dimension of 203 mm long×140 mm wide×3 mm thick were injection molded using the same SANDRETTO injection molding machine used in the spiral flow measurements described above. Molding conditions are set forth below:

| Gate type | film gate |
| --- | --- |
| Machine | SANDRETTO Series 7 190 |
| Melt temperature | 250° C. |
| Mold temperature | 30° C. |
| Injection time | 6 seconds |
| Total cycle time | 45 seconds |

The resulting plaques are visually examined for tiger striping under sunlight using the naked eye.

TABLE 1

| Ex. No. | | 1 |
|---|---|---|
| FIRST GAS PHASE REACTOR (HOMOPOLYMER) | | |
| Temperature | °C. | 65 |
| Polymer produced | wt % | 35 |
| MFR L | g/10 | 1.5 |
| Xylene insoluble | wt % | 96.0 |
| H2/C3- feed ratio | mol. | 0.002 |
| SECOND GAS PHASE REACTOR (COPOLYMER) | | |
| Temperature | °C. | 75 |
| Polymer produced | wt % | 35 |
| MFR 5 kg, 230° C. | g/10 | 0.43 |
| C2-/(C2- + C3-) feed ratio | mol. | 0.25 |
| H2/C2- feed ratio | mol. | 0.006 |
| C2-content in C2C3 copolymer | wt % | 40 |
| C2-content | wt % | 20.2 |
| Xylene insoluble | wt % | 56.6 |
| Xylene soluble I.V. | dl/g | ~6.6 |
| THIRD GAS PHASE REACTOR (HOMOPOLYMER) | | |
| Temperature | °C. | 75 |
| Polymer produced | wt % | 30 |
| H2/C3- feed ratio | mol. | 0.644 |
| MFR L (calculated) | g/10 | 300 |
| MFR L (total) | g/10 | 1.1 |

TABLE 1-continued

| FINAL COMPOSITION | | |
|---|---|---|
| Calcium Stearate | wt % | 0.05 |
| Oil ob30 | wt % | 0.05 |
| B215 stabilizer | wt % | 0.15 |
| Homo PP | wt % | 23 |
| MFR L | g/10 | 8.5 |
| Xylene insoluble | wt % | 74 |
| Xylene soluble I.V. | dl/g | 6.59 |
| C2-content | wt % | 10.3 |
| D.S.C. Melting temperature | °C. | 162.4 |
| D.S.C. Melting enthalpy | J/g | 79.0 |
| D.S.C. Crystallization | °C. | 112.3 |
| Flexural modulus | MPa | 1030 |
| Tensile strength at yield | MPa | 21.6 |
| Elongation at yield | % | 7.9 |
| Tensile strength at break | MPa | 18.1 |
| Elongation at break | % | 470 |
| Izod at 23° C. | J/m | 174 |
| Izod at −30° C. | J/m | 61 |
| Energy at −30° C. | J | 9.6 |
| Die swell 120s $^{-1}$, 200° C. | % | 77 |
| Spiral flow at 230° C. and 20 bar | mm | 360 |
| Spiral flow at 230° C. and 40 bar | mm | 650 |
| Spiral flow at 230° C. and 60 bar | mm | 890 |
| Spiral flow at 230° C. and 80 bar | mm | 1125 |
| Spiral flow at 230° C. and 100 bar | mm | 1375 |
| Gloss 60° C. on 1 mm plaque | % | 59.7 |
| Tiger stripes | | None |

TABLE 2

| Ex. No. | | 2 | 3 | 4 | 5 | 6 |
|---|---|---|---|---|---|---|
| FIRST GAS PHASE REACTOR (HOMOPOLYMER) | | | | | | |
| Temperature | °C. | 70 | 70 | 70 | 70 | 70 |
| Polymer produced | wt % | 34 | 31 | 23 | 28 | 30 |
| H2/C3- feed ratio | mol | .0011 | .0001 | .0009 | .0026 | .0078 |
| MFR L | g/1 | 0.97 | 1.2 | 1.1 | 1.5 | 1.5 |
| SECOND GAS PHASE REACTOR (COPOLYMER) | | | | | | |
| Temperature | °C. | 70 | 70 | 70 | 70 | 70 |
| Polymer produced | wt % | 33 | 36 | 38 | 38 | 35 |
| MFR 5 kg, 230° C. | g/1 | 0.45 | 0.25 | 0.26 | 0.54 | 0.42 |
| C2- | wt % | 19.0 | 20.7 | 23.4 | 21.9 | 20.7 |
| Xylene insoluble | wt % | 56.4 | 64.1 | 51.0 | 52.3 | 51.8 |
| Xylene soluble I.V. | dl/ | 5.96 | — | 6.89 | 5.36 | 5.85 |
| C2-/(C2- + C3-) | mol | 0.25 | 0.25 | 0.25 | 0.25 | 0.25 |
| H2/C2- feed ratio | mol | 0.0130 | .0142 | — | .0131 | .0140 |
| C2- in copolymer | wt % | 38 | 38 | 38 | 38 | 38 |
| THIRD GAS PHASE REACTOR (HOMOPOLYMER) | | | | | | |
| Temperature | °C. | 75 | 75 | 75 | 75 | 75 |
| Polymer produced | wt % | 33 | 33 | 39 | 34 | 35 |
| H2/C3- feed ratio | mol | 0.160 | 0.176 | — | 0.675 | 0.691 |
| MFR L (calculated) | g/1 | 140 | 100 | 70 | 700 | 780 |
| MFR L (total) | g/1 | 1.1 | 0.6 | 0.86 | 2.3 | 2.2 |
| C2- | wt % | 12.7 | 13.8 | 14.2 | 14.4 | 13.5 |
| Xylene insoluble | wt % | 71.7 | 72.9 | — | 66.1 | 65.6 |
| Xylene soluble I.V. | dl/ | 6.37 | 7.29 | — | — | 5.88 |

TABLE 2-continued

| Ex. No. | | 2 | 3 | 4 | 5 | 6 |
|---|---|---|---|---|---|---|
| | | FINAL COMPOSITION | | | | |
| Ca Stearate | wt % | 0.05 | 0.05 | 0.05 | 0.05 | 0.05 |
| Oil ob30 | wt % | 0.05 | 0.05 | 0.05 | 0.05 | 0.05 |
| B215 | wt % | 0.15 | 0.15 | 0.15 | 0.15 | 0.15 |
| Homo PP | wt % | 23 | 23 | 23 | 23 | 23 |
| MFR L | g/10' | 5.32 | 4.7 | 5.5 | 12.1 | 13.1 |
| Gloss 60° C. | ‰ | 58 | 57 | 54 | 55 | 55 |
| DSC Tm | ° C. | 165.4 | 164.3 | 163.4 | 160.9 | 162.1 |
| DSC Tc | ° C. | 110.2 | 112.3 | 110.3 | 107.0 | 116.6 |
| DSC Dh | J/g | 81.0 | 79.0 | 76.2 | 67.6 | 93.1 |
| Izod 23° C. | J/m | N.B. | N.B. | N.B. | 344 | 286 |
| Izod −30° C. | J/m | 70 | 100 | 96 | 80% | 90% |
| | | | | | 271 | 250 |
| | | | | | 20% | 10% |
| | | | | | 602 | 612 |
| Energy −30° C. | J | 13.7 | 14 | 13 | 12.4 | 13.3 |
| Flexural modulus | MPa | 890 | 830 | 830 | 960 | 970 |
| Tens. Yield strength | MPa | 21.1 | 20.1 | 19.9 | 21 | 21.4 |
| Yield elongation | % | 9.3 | 10.8 | 10.5 | 7.9 | 8 |
| Tens. Break strength | MPa | >23 | >23 | 21.9 | 17.4 | 18.4 |
| Break elongation | % | >570 | >530 | 550 | 620 | 630 |

Note to Tables:
H2 means hydrogen;
C2- means ethylene;
C3- means propylene;
g/10' means g/10 min.;
N.B. means No Break;
Oil ob30 means paraffinic oil; and
Homo PP means a propylene homopolymer having a melt flow rate of 1000 g/10 min.

Other features, advantages and embodiments of the invention disclosed herein will be readily apparent to those exercising ordinary skill after reading the foregoing disclosures. Accordingly, while specific embodiments of the invention have been described in considerable detail, variations and modifications of those embodiments can be effected without departing from the spirit and scope of the invention as claimed.

What is claimed is:

1. A masterbatch composition, comprising (percent by weight):
   A) 20%–90% of a crystalline polypropylene component containing from 25% to 75% of a fraction $A^I$ having a melt flow rate $MFR^I$ of from 0.5 to 10 g/10 min., and from 75% to 25% of a fraction $A^{II}$ having a melt flow rate $MFR^{II}$ such that a ratio $MFR^{II}/MFR^I$ is from 30 to 2000; and
   wherein fractions $A^I$ and $A^{II}$ are independently selected from the group consisting of a propylene homopolymer, a random copolymer of propylene containing up to 8% of ethylene, and a random copolymer of propylene containing up to 8% of at least one $C_4$–$C_{10}$ α-olefin; and
   B) 10%–80% of a copolymer component of ethylene and at least one $C_3$–$C_{10}$ α-olefin, the copolymer containing from 10 to 70% of ethylene, and optionally minor amounts of a diene, said copolymer being soluble in xylene at room temperature, and having an intrinsic viscosity [η] of from 4 to 9 dl/g.

2. The masterbatch composition of claim 1, wherein fraction $A^I$ and fraction $A^{II}$ each present in an amount ranging from 30 to 70 weight percent.

3. The masterbatch composition of claim 2, wherein fraction $A^I$ and fraction $A^{II}$ are each present in an amount ranging from 45 to 55 weight percent.

4. The masterbatch composition of claim 1, wherein said ratio $MFR^{II}/MFR^I$ is from 40 to 2000.

5. The masterbatch composition of claim 4, wherein said ratio $MFR^{II}/MFR^I$ is from 50 to 1000.

6. The masterbatch composition of claim 1, wherein said ratio $MFR^{II}/MFR^I$ is from 100 to 800.

7. The masterbatch composition of claim 1, wherein said copolymer component contains from 15 to 60% by weight ethylene.

8. The masterbatch composition of claim 1, wherein said copolymer component contains from 15 to 50% by weight ethylene.

9. The masterbatch composition of claim 1, wherein said copolymer component has an intrinsic viscosity of from 5 to 8 dl/g.

10. The masterbatch composition of claim 9, wherein said copolymer component has an intrinsic viscosity of from 5.5 to 7 dl/g.

11. The masterbatch composition of claim 1, wherein said crystalline polypropylene component is present in an amount ranging from 30 to 80%.

12. The masterbatch composition of claim 11, wherein said crystalline polypropylene component is present in an amount ranging from 50 to 70%.

13. The masterbatch composition of claim 1, wherein said copolymer composition is present in an amount ranging from 70 to 20%.

14. The masterbatch composition of claim 13, wherein said copolymer composition is present in an amount ranging from 50 to 20%.

* * * * *